United States Patent
Grynyov et al.

(10) Patent No.: US 8,058,624 B2
(45) Date of Patent: Nov. 15, 2011

(54) METHOD OF DETECTION OF FAST NEUTRONS

(75) Inventors: Boris Viktorovich Grynyov, Kharkov (UA); Volodymyr Diomydovych Ryzhikov, Kharkov (UA); Liudmyla Lavrentiivna Nagorna, Kharkov (UA); Genadiy Mychaylovich Onishenko, Kharkov (UA); Leonid Oleksiyvich Piven, Kharkov (UA)

(73) Assignee: Institute of Scintillation Materials, National Academy of Sciences of Ukraine, Kharkov (UA)

( * ) Notice: Subject to any disclaimer, the term of this patent is extended or adjusted under 35 U.S.C. 154(b) by 207 days.

(21) Appl. No.: 12/435,146

(22) Filed: May 4, 2009

(65) Prior Publication Data

US 2009/0272910 A1    Nov. 5, 2009

(30) Foreign Application Priority Data

May 5, 2008   (UA) ................................ 200805811

(51) Int. Cl.
*G01T 3/06* (2006.01)
(52) U.S. Cl. ................................. 250/390.11
(58) Field of Classification Search .............. 250/390.11
See application file for complete search history.

(56) References Cited

U.S. PATENT DOCUMENTS

| | | | | |
|---|---|---|---|---|
| 2,854,584 | A | * 9/1958 | Youmans | 250/390.11 |
| 3,008,045 | A | * 11/1961 | Ruderman | 250/366 |
| 5,008,067 | A | * 4/1991 | Czirr | 376/159 |

FOREIGN PATENT DOCUMENTS

| | | |
|---|---|---|
| RU | 2129289 | 4/1997 |
| RU | 2088952 | 8/1997 |

OTHER PUBLICATIONS

H. Klein et al., "Scintillation detectors for fast neutrons." Proceedings of Science, Intl Workshop on Fast Neutron Detectors, U of Cape Town, South Africa, Apr. 3-6, 2006, pp. 1-24.*
F. Tokanai et al., "Cold neutron imaging detection with a GSO scintillator." Nucl. Inst. Meth. A452 (2000) 266-272.*
C. M. Bartle et al., "Small inorganic scintillators as neutron detectors." Nucl. Inst. Meth. A422 (1999) 54-58.*
M. Anelli et al., "Measurement and simulation of the neutron response and detection efficiency of a Pb-scintillating fiber calorimeter," Nuclear Instruments and Methods in Physics Research A 581 (2007) 368-371.
V. Nekrasov et al., "Scintillation blocks of high sensitivity for detection of gamma-radiation based on cadmium tungstate," The First International Conference on Inorganic Scintillators and Their Application, SCINT99, Scientific Program and Abstracts, Aug. 16-30, 1999, Moscow, Russia.
V. Nekrasov et al., The use of y-detection block of the increased efficiency based on heavy scintillators in radiation safety control systems, Radiotekhnika: All-Urk. Sci. Interdep. Mag. 2004, No. 139, p. 130-135.
V. Ryzhikov et al., "Detection of thermal and resonance neutrons using oxide scintillators," IEEE Transactions on Nuclear Science, vol. 47, No. 6, Dec. 2000, pp. 2061-2064.
V. Ryzhikov et al., "A high efficiency detection method of resonance and fast neutron fluxes for systems using inelastic scattering," Proc. SORMA-2008 Conference, 2008.
V.V. Nekrasov, L.A. Piven, A.F. Koval et al., "A stationary customs inspection system for detection of fissionable and radioactive materials on the basis of a combined detection block," East European Journal of Advanced Technologies, No. 412 (1b), 2005, p. 16-21.

* cited by examiner

*Primary Examiner* — Constantine Hannaher
(74) *Attorney, Agent, or Firm* — Kinney & Lange, P.A.

(57) ABSTRACT

A simple method is developed for detection of fast neutrons for systems of detection of radioactive materials, which does not involve moderator systems, operates on the real time scale and ensures high detection efficiency. The method includes conversion of the cascade of gamma-quanta formed as a result of inelastic scattering of neutrons in a converter material with high atomic number into a set of light scintillations by a scintillator, processing of signals obtained in recording of said scintillations, formation of counting pulses with frequency proportional to the neutron flux and their recording according to an appropriate algorithm. Inorganic scintillators with high effective atomic number are used, and, as converter materials for inelastic scattering of neutrons, materials with high atomic numbers are used, which are a constituent part of said inorganic scintillators. Processing of the obtained signals is carried out by their integration with time constant of at least 30 microseconds, and formation of counting pulses is made by selection of the integrated signals in the energy range equivalent to 10-300 keV. Examples of inorganic scintillators comprising material with high effective atomic number used as the converter are crystals BGO, GSO, ZnWO, CWO, CsI (Tl), NaI(Tl), and LiI(Eu).

2 Claims, No Drawings

METHOD OF DETECTION OF FAST NEUTRONS

CROSS-REFERENCE TO RELATED APPLICATION(S)

This application claims priority from Ukraine Application No. 200805811 filed on May 5, 2008.

BACKGROUND

The invention is related to the field of detection of radioactive contamination sources and the presence of radioactive materials in moving objects, and is designed for complexes and systems of radiation monitoring used in dosimetric customs and security services related to tasks of nuclear safety and State Atom Inspection.

For detection of fast neutrons, the technologies generally used are organic hydrogen-containing materials based on plastics (CH), or stilbene [Patent of Russian Federation No. 2088952, G01T 1/20], or helium counters [V. I. Ivanov, Course of Dosimetry, Moscow: Energoatomizdat, 1988, p. 399]. For detection of thermal neutrons, scintillation crystal $^6$Li(Eu) containing $^6$Li is used [Yu. K. Akimov, Scintillation methods for detection of high energy particles, Moscow: Ed. Moscow State University, 1963]. This scintillator, however, has low detection efficiency of fast neutrons and is also highly hygroscopic, which hinders its broad application.

The detection efficiency with these materials does not exceed 1-10%.

A method for detection of fast neutrons is known [Patent of Russian Federation No. 2129289, G01T 1/167], based on the mechanism of elastic scattering of fast neutrons in a hydrogen-containing material with subsequent recording of "thermal" neutrons by $^3$He-based counters. Signals obtained in the counters are amplified to the required level, and counter pulses are formed with frequency proportional to the neutron flux, with subsequent detection of neutrons using appropriate algorithms.

The efficiency of methods using the elastic scattering mechanism does not exceed 10%, and for reliable detection of weak fluxes of fast neutrons, detector panels of large volume, area, and weight are to be used. Thus, neutron detectors based on $^3$He-counters used in the "Yantar" system produced by "ASPEKT" involves 8 tubes filled with $^3$He, with dimensions Ø30×900 mm, placed in a polyethylene moderator. The efficiency of fast neutron detection using this method is 8%. The sensitivity of the detector panel of 120×100×1000 mm dimensions is 350 pulses-cm$^2$/neutron·s, and weight is 130 kg.

Another known method of fast neutron detection [Data sheet of NUCSAFE ins. Last modified, Oct. 29, 2007] is based on elastic scattering of fast neutrons in hydrogen-containing material with subsequent recording of "thermal" and "slow" neutrons by a scintillating glass fiber placed in a hydrogen-containing material. Signals recorded in the scintillating glass fiber are amplified to the required level, counting pulses are shaped with frequency proportional to the neutron flux, and neutrons are detected according to the appropriate algorithm.

However, as in the first method, ensuring high sensitivity to fast neutrons requires the use of moderators made of hydrogen-containing material. Because the scintillation glass fiber has low sensitivity to fast neutrons, obtaining the desired sensitivity requires the use of detector panels of large volume, area and, consequently, weight. The efficiency of fast neutron detection by this method also does not exceed 8%. The sensitivity of a detector panel of 1000 to 6000 cm$^2$ area is ~300 pulses-cm$^2$/neutron·s.

Still another known method of fast neutron detection [M. Anelli., G. Battistoni, C. Bini, et. al., Measurement and simulation of the neutron response and detection efficiency of a Pb-scintillating fiber calorimeter, Nuclear Instruments and Methods in Physics Research A 581 (2007) 368-372] is based on inelastic scattering of fast neutrons in lead, which is used as a converter. 200 layers of lead foil of 0.5 mm thickness are used, in the grooves of which fiber organic scintillators are placed, and signals are recorded that result from interaction of organic fiber scintillators with cascades of gamma-quanta formed due to inelastic scattering of neutrons in the lead foil (converter). Then their full analysis is carried out with subsequent conversion of the obtained information into a digital code using 40+40 blocks of analog-to-digital converters. The obtained data array is written onto a digital carrier and is processed using powerful computers. Then counting pulses are formed with frequency proportional to the neutron flux, counting rate is calculated depending on the neutron flux, and neutrons are recorded according to the appropriate algorithm.

However, this method of fast neutron detection is rather complex and labor-consuming, because it requires full analysis of all signals emerging from the interaction of fast neutrons with the converter (the presence of which increases the detector size), preliminary recording of intermediary data onto the information carrier and subsequent data processing using powerful computers. This makes this method not suitable for its use in radioactive materials detection systems operating on the real time scale.

The last of these analogs has been chosen as a prototype.

SUMMARY

The purpose of this invention is development of a more simple method of fast neutron detection for radioactive materials detection systems, which would not use neutron moderator systems, would operate on the real time scale and would ensure higher efficiency of neutron detection.

This is achieved in the following way. The method of fast neutron detection is based on inelastic scattering of fast neutrons in a converter and involves transformation of the gamma-quanta cascade formed as a result of inelastic scattering of fast neutrons in the converter material into a set of light flashes by a scintillator, processing of signals obtained in recording of said light flashes, formation of counting pulses with frequency proportional to the neutron flux, and detection of fast neutrons using an appropriate algorithm. According to our invention, inorganic scintillators with high effective atomic number are used as the converter material, ensuring inelastic scattering of fast neutrons. With said scintillators containing materials with high atomic number, processing of the obtained signals is carried out by their integration with an integration constant of 30 microseconds, and formation of the counting pulses is realized by selection of the integrated signals in the 10-300 keV range.

Inorganic scintillators using materials with high effective atomic number as the converter include crystals of bismuth germinate (BGO), gadolinium silicate (GSO), zinc tungstate (ZnWO), cadmium tungstate (CWO), thallium-activated cesium iodide (CsI(Tl)), thallium-activated sodium iodide (NaI(Tl)), lithium iodide doped with europium (LiI(Eu)).

DETAILED DESCRIPTION

The method of fast neutron detection disclosed herein is based on inelastic scattering of fast neutrons in a converter and involves transformation of the gamma-quanta cascade formed as a result of inelastic scattering of fast neutrons in the converter material into a set of light flashes by a scintillator, processing of signals obtained in recording of said light flashes, formation of counting pulses with frequency proportional to the neutron flux, and detection of fast neutrons using an appropriate algorithm. According to our invention, inorganic scintillators with high effective atomic number are used as the converter material, ensuring inelastic scattering of fast neutrons. With said scintillators containing materials with high atomic number, processing of the obtained signals is carried out by their integration with an integration constant of 30 microseconds, and formation of the counting pulses is realized by selection of the integrated signals in the 10-300 keV range.

Inorganic scintillators using materials with high effective atomic number as the converter include crystals of bismuth germinate (BGO), gadolinium silicate (GSO), zinc tungstate (ZnWO), cadmium tungstate (CWO), thallium-activated cesium iodide (CsI(Tl)), thallium-activated sodium iodide (NaI(Tl)), lithium iodide doped with europium (LiI(Eu)).

By contrast with the prototype, where cascades of gamma-quanta emerge as a result of inelastic scattering of neutrons in the lead foil converter as a separate element of the detector design, and light scintillations result from interaction of gamma-quanta with organic scintillators, the method described herein uses cascades of gamma-quanta emerging as a result of inelastic scattering of fast neutrons on nuclei of a material with high atomic number which is a constituent part of said inorganic scintillators, and light scintillations emerge as a result of interaction of "internal" gamma-quanta that are being formed with the material of the same scintillator.

Thus, the use of the inelastic scattering mechanism allows combination of two functions in the same scintillation crystal, which, in turn, excludes the need of using an additional converter material. This allows substantial simplification of the detector design and improvement of fast neutron detection efficiency.

The emerging cascades of gamma-quanta have different energy values and different delay times of gamma-quanta with respect to the moment of interaction of a neutron with the substance ($T_{del}=1 \cdot 10^{-9}-1.3 \cdot 10^{-6}$ s.). Therefore, achieving unambiguous correspondence of the fact of interaction of a fast neutron with converter material and appearance of a counting pulse in the electronic processing block, the integration time constants, as shown by our experiments, should not be less than 30 microseconds. It is known that neutron sources are also rather intense sources of gamma-radiation. At the same time, inorganic scintillators show high detection efficiency of gamma-radiation, including the background radiation. Therefore, for separate detection of neutrons, the method envisages the use of lead protection from low-energy gamma-radiation. Protection from high energy gamma-quanta is provided by limitation of the recorded energy range—10-300 keV.

In the Table, values of full detection efficiency of fast neutrons are given for certain types of inorganic scintillators, which were determined experimentally using the proposed detection method as compared with analogs.

The preferred embodiment of the proposed method is described by the following.

For detection of fast neutrons, detection on the basis of an inorganic scintillator is used, e.g., gadolinium silicate, which is optically coupled to the photodiode connected to the signal processing block. In the converter material (in this case, gadolinium, an element with a high atomic number) fast neutrons undergo inelastic scattering giving rise to cascade of gamma-quanta, which, in turn, are transformed in the same scintillator material to a set of light scintillations recorded by a photodiode. In the signal processing block these scintillation signals are integrated with an integration time constant 30 microseconds, and counting pulses are formed by selection of integrated signals in the energy range 10-300 keV using the appropriate algorithm.

With the use of other above-listed scintillators, the method is realized in a similar way.

TABLE

|  | NaI | LiI | CsI | GSO | ZnWO | CWO | BGO | Prototype (Pb) | Analog 1 | Analog 2 |
|---|---|---|---|---|---|---|---|---|---|---|
| Density (g/cm³) | 3.67 | 4.08 | 4.51 | 6.71 | 7.87 | 7.9 | 7.13 | 5 | — | — |
| Effective atomic number | 51 | 52 | 54 | 59 | 61 | 66 | 75 | 82 | — | — |
| Full detection efficiency % | 47 | 44 | 48 | 59 | 58 | 59 | 60 | 50 | 8 | 8 |

In the experiments, we used a plutonium-beryllium source $^{239}$Pu—Be No. 577-68, which produced at distance r=300 mm density of the fast neutron flux $$\phi = 9.37 \frac{n}{s \cdot cm^2}.$$

The experimental data given in the Table show that full detection efficiency of fast neutrons measured using different crystals using the proposed method in the gamma-radiation energy range 10-300 keV was from 40% to 60%, which is in agreement with the prototype results (50%) and is substantially higher than detection efficiency of fast neutrons obtained with existing analogs (8%). The use of an original method of processing of primary signals allows simplification of the procedure of obtaining the final data, which ensures the possibility of the use of the proposed method in systems for detection of radioactive substances operating on the real time scale.

The use of the proposed method, based on the mechanism of inelastic scattering in scintillators with high atomic number, allows the use for detection of fast neutrons even such scintillators as CsI(Tl) and NaI(Tl), which have been traditionally used for detection of α-, β- and gamma-radiation (see Table).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of detection of fast neutrons based on the mechanism of inelastic scattering of fast neutrons in a converter material, involving conversion of a cascade of gamma-quanta formed as a result of inelastic scattering of neutrons in the converter material with high atomic number into a set of light scintillations by a scintillator, processing of signals obtained in recording of said scintillations, formation of counting pulses with a frequency proportional to the neutron flux and their recording according to an appropriate algorithm, the improvement comprising:

using inorganic scintillators with high atomic number, wherein:

a material with high atomic number that is a constituent part of said inorganic scintillators is used as the converter material for ensuring inelastic scattering of fast neutrons;

processing of the obtained signals is carried out by their integration with a time constant of at least 30 microseconds; and formation of the counting pulses is made by selection of the integrated signals in the energy range equivalent to 10-300 keV.

2. The method of claim 1, wherein said inorganic scintillator comprising material with high effective atomic number used as the converter material is chosen from crystals BGO, GSO, ZnWO, CWO, CsI(Tl), NaI(Tl), and LiI(Eu).

* * * * *